United States Patent [19]
Bianco

[11] Patent Number: 5,154,091
[45] Date of Patent: Oct. 13, 1992

[54] LINEAR SCREW AND/OR CIRCULATING BALL ACTUATOR

[75] Inventor: Carlo Bianco, Milan, Italy

[73] Assignee: Ricerca Elettromeccanica S.r.l., Milan, Italy

[21] Appl. No.: 765,904

[22] Filed: Sep. 24, 1991

[30] Foreign Application Priority Data

Jan. 25, 1991 [IT] Italy .................. MI91A000179

[51] Int. Cl.$^5$ ............................................. F16H 25/22
[52] U.S. Cl. ................................. 74/459; 74/424.8 R
[58] Field of Search ............... 74/424.8 R, 459, 89.15

[56] References Cited

U.S. PATENT DOCUMENTS

| | | | |
|---|---|---|---|
| 477,642 | 6/1892 | Brunthaver | 74/459 |
| 2,844,969 | 7/1958 | Lohr | 74/459 X |
| 3,898,890 | 8/1975 | Simmons et al. | 74/459 X |
| 3,902,377 | 9/1975 | Lemor | 74/459 |
| 4,074,585 | 2/1978 | Richaud et al. | 74/459 X |
| 4,100,850 | 7/1978 | Wolbrink et al. | 74/424.8 R |
| 4,148,226 | 4/1979 | Benton | 74/459 |

FOREIGN PATENT DOCUMENTS 3425285 1/1986 Fed. Rep. of Germany ........ 74/459

*Primary Examiner*—Allan D. Herrmann
*Attorney, Agent, or Firm*—Notaro & Michalos

[57] ABSTRACT

A linear screw and/or circulating ball actuator comprises a nut in which there is a return duct for the balls, closed by two head walls in which there are passages which connect the duct to the helicoidal groove, and in which both the nut and the head walls are sintered.

3 Claims, 2 Drawing Sheets

LINEAR SCREW AND/OR CIRCULATING BALL ACTUATOR

FIELD AND BACKGROUND OF THE INVENTION

This invention proposes a linear actuator of the screw and/or circulating ball type, in which the nut is joined at the head ends with closure walls which serve also as thrust bearing rings and have, on the inside have channels connecting the helicoidal thread of the screw-nut coupling with a channel for the return of the balls.

To ensure the required precision without resorting to complicated working, both the nut and the walls of the head are sintered.

In various fields of mechanical engineering, circulating ball actuators are used which include a nut consisting of a body which is basically cylindrical, rotated about its axis and held along its axis, and a rotating screw which is constrained along its axis inside said actuator.

The nut screw coupling occurs through a number of ball bearings which move along a helicoidal groove in the external surface of the screw and on the internal surface of the nut.

In some of these actuators the return path of the ball consists of a tubular element which runs externally of the nut.

In other versions a pair of holes are made in the nut and two plugs are inserted which are shaped and calibrated for the passage of the balls, thus joining the return channel to the helicoidal groove.

From the point of view of construction, this work is rather complicated, requiring a number of precision processes for the various parts to be assembled exactly. This is even more so when one considers that these actuators must work to be very strict tolerance to the order of a few hundredths of a millimeter.

On the other hand screw and/or circulating ball actuators are quite compact, requiring a low power motor, and are thus highly suited to use in a number of applications where production may be possible at considerably lower cost than for the current devices.

SUMMARY OF THE INVENTION

To resolve said problem the invention proposes a screw and/or circulating ball linear actuator in which the return channel is cut into the nut and the passages for connection of said channel to the helicoidal groove are in the locking walls which close the head of the nut. Both the nut and the head wall are sintered, thus obtaining the required precision without the need for complicated or costly processing to be carried out.

BRIEF DESCRIPTION OF THE DRAWINGS

The invention will now be described in detail for the purpose of general illustration and with reference to the enclosed drawings in which.

DESCRIPTION OF THE PREFERRED EMBODIMENT

Figure 1:
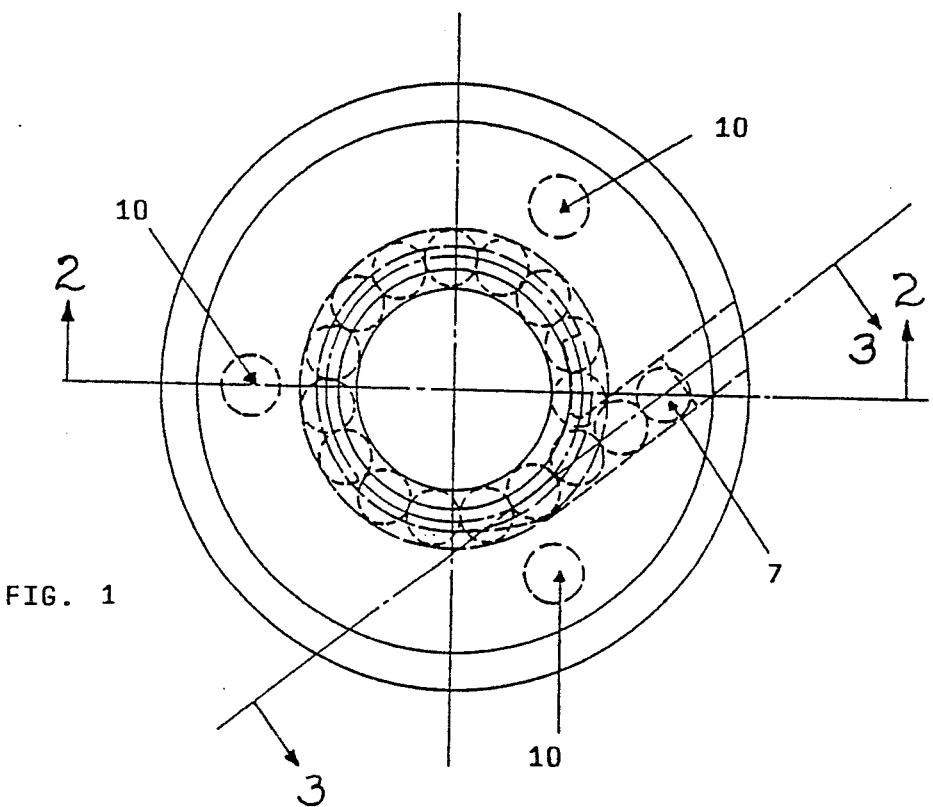
FIG. 1 is a plan view of an actuator as per the invention.
Figure 3:
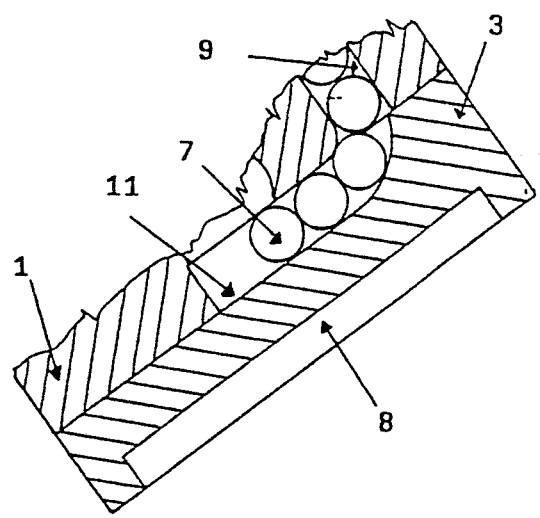
FIG. 3 is a section along line 3—3 of FIG. 1.
Figure 2:
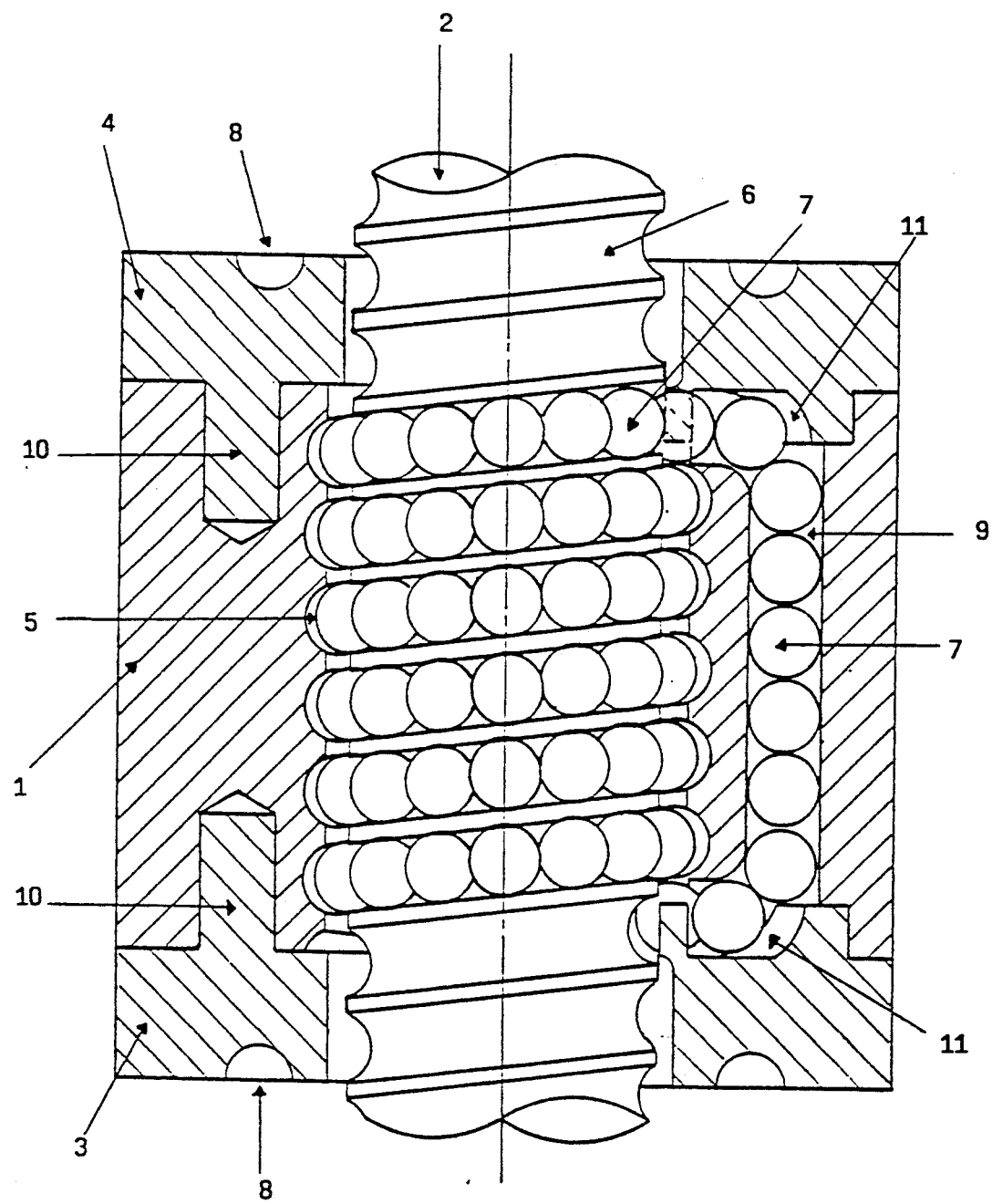
FIG. 2 is a section along line 2—2 of FIG. 1.

The actuator of the invention consists of a nut 1 which is essentially cylindrical, crossed along its axis by a hole in which a screw 2 runs which constitutes the mobile part of the actuator.

The nut has opposite faces closed at the head by walls 3 and 4 which are also drilled to allow the passage of the screw 2.

The nut 1 has a helicoidal thread 5 on its internal surface with a semicircular cross-section, with a corresponding thread 6 on the external surface of the screw.

The two threads (5 and 6) together form a helicoidal channel in which a number of balls (7) run.

The walls (3 and 4) form external thrust bearing races 8, structured in such a way that, as well as locking elements for the nut, they may also be used as thrust bearing rings for the mounting of the nut in its own support (not illustrated in the drawing).

A channel or through passage 9 extending parallel to the axis of the nut is made in the body of this latter part and crosses it completely.

From the opposite side the nut has a pair of housings or blind bores in which pins 10 or structure are inserted, made as a single piece with the head walls 3 and 4 which ensure an exact centering.

End passages 11 are also defined in head walls 3 and 4 for, connecting the extremities of the duct 9 to the helicoidal groove.

Consequently, the balls 7 which move along the helicoidal groove return along the passages 9 and 11.

This configuration, with the passages connecting the duct 9 to the helicoidal groove in the head walls, allows the head walls and the nut to be sintered, thus obtaining the finished components in a single operation without the need for further working.

The use of powder technology ensures the required precision, thus allowing the actuator to be produced at very low and competitive cost.

The functioning of the device appears clear from the description given.

The nut is mounted on its support with the possibility of rotating around its own axis but constrained in the direction of its axis. Mounting is by way of semi-thrust bearing in the head walls (3 and 4) of the actuator. The screw is then placed in a traverse position in a well-known way by a motor which activates a pinion which engages teeth on the external surface of the nut.

All these particulars, which are of a well-known type, are not illustrated in the drawing, to give greater clarity. The mobile element of the actuator is the screw 2, constrained in rotation but capable of movement along its axis inside the actuator.

By rotating the nut linear movement of screw 2 is caused through the balls 7.

The ball bearings 7 which come out of the helicoidal threads go along the duct (9) through the passages (11) and then complete the circle, coming back from the opposite side. The mounting of the actuator is also very simple in that the exact position of the head walls with respect to the nut is ensured by the pin 10.

The same idea may be put into practice in different ways which should, however, be held to be included within the bounds of this invention.

Equally, the dimensions and the materials used may vary as a function of the requirements of use.

I claim:

1. A linear circulating ball actuator, comprising:
   a nut made of sintered material and having an axial hole therethrough, said nut having an internal thread on an inner surface of said hole, said nut having opposite faces and a through passage extending through the nut between said opposite faces and at a location spaced from said hole;

a head wall fixed to each of said opposite faces of said nut, each head wall having an opening aligned with said hole and means for fixing said head wall to an opposite face of said nut, each head wall having an outer surface facing away from said nut and a thrust bearing race in the outer surface of each head wall for use in forming part of a thrust bearing for supporting opposite ends of the nut, each head wall including an end passage communicating with a face of said nut and communicating with an end of said through passage for supplying ball bearings to and receiving ball bearings from said through passage, each of said head walls being made of sintered material;

a screw mounted for rotation in said hole and through said openings of said head walls, said screw having an external thread alignable with said internal thread of said nut to form a groove, opposite ends of said groove communicating with said end passages; and a plurality of ball bearings in said groove, said end passages and said through passage, for circulation therealong with relative rotation and linear movement between said screw and said nut.

2. An actuator according to claim 1, including means for connecting said head walls to said nut comprising a plurality of blind bores in each of the opposite faces of said nut and pin means extending from each head wall and engaged into a respective blind bore.

3. An actuator according to claim 2, wherein said thrust bearing races are each circular races having semi-circular cross sections defined in the outer surface of a respective head wall.

* * * * *